US006539504B1

United States Patent
Knefel

(10) Patent No.: US 6,539,504 B1
(45) Date of Patent: Mar. 25, 2003

(54) MEMORY SYSTEM HAVING ERROR MONITORING APPARATUS FOR MULTI-BIT ERRORS

(75) Inventor: Hans-Werner Knefel, Martinsried (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/230,757

(22) PCT Filed: Aug. 6, 1997

(86) PCT No.: PCT/DE97/01644

§ 371 (c)(1),
(2), (4) Date: Feb. 1, 1999

(87) PCT Pub. No.: WO98/09216

PCT Pub. Date: Mar. 5, 1998

(30) Foreign Application Priority Data

Aug. 30, 1996 (DE) .......................................... 196 35 237

(51) Int. Cl.$^7$ ............................................... G11K 29/00
(52) U.S. Cl. ....................................... 714/718; 714/766
(58) Field of Search ................................ 714/762, 820, 714/718, 766, 763, 764; 365/201; 370/359, 360

(56) References Cited

U.S. PATENT DOCUMENTS

| | | | | |
|---|---|---|---|---|
| 4,993,028 A | * | 2/1991 | Hillis .......................... | 714/762 |
| 5,043,990 A | * | 8/1991 | Doi et al. .................... | 714/820 |
| 5,313,425 A | * | 5/1994 | Lee et al. .................... | 365/201 |
| 5,872,780 A | * | 2/1999 | Demiray et al. ............. | 370/359 |
| 5,907,717 A | * | 5/1999 | Ellis ............................ | 370/360 |

* cited by examiner

Primary Examiner—David Ton
(74) Attorney, Agent, or Firm—Shaw Pittman LLP

(57) ABSTRACT

The data contents of memory systems are mostly safeguarded via an EDC method. The memory system is structured such that the recognizability of multi-bit errors is improved considerably by the EDC method.

6 Claims, 5 Drawing Sheets

Monitoring of the CMY-Internal Address Paths

(Address Half) Word Half 0

|   | 00 | 01 | 02 | 03 | 04 | 05 | 06 | 07 | 08 | 09 | 10 | 11 | 12 | 13 | 14 | 15 |    |
|---|----|----|----|----|----|----|----|----|----|----|----|----|----|----|----|----|----|
| O |    |    |    |    | X  | X  | X  | X  | X  |    |    |    |    |    | X  |    | C0 |
| O |    |    |    | X  | X  | X  |    |    | X  | X  | X  | X  | X  | X  |    |    | C1 |
| E |    |    |    | X  |    | X  | X  |    | X  |    | X  | X  |    |    |    | X  | C2 |
| E |    |    |    | X  | X  |    |    |    |    | X  |    |    |    | X  |    | X  | C3 |
|   |    |    |    |    |    |    |    |    |    |    |    |    |    |    |    |    | C4 |
|   |    |    |    |    |    |    |    |    |    |    |    |    |    |    |    |    | C5 |
|   |    |    |    |    |    |    |    |    |    |    |    |    |    |    |    |    | C6 |
|   |    |    |    |    |    |    |    |    |    |    |    |    |    |    |    |    | C7 |

(Address Half) Word Half 1

|   | 16 | 17 | 18 | 19 | 20 | 21 | 22 | 23 | 24 | 25 | 26 | 27 | 28 | 29 | 30 | 31 |    |
|---|----|----|----|----|----|----|----|----|----|----|----|----|----|----|----|----|----|
|   |    |    |    |    |    |    |    |    |    |    |    |    |    |    |    |    | C0 |
|   |    |    |    |    |    |    |    |    |    |    |    |    |    |    |    |    | C1 |
|   |    |    |    |    |    |    |    |    |    |    |    |    |    |    |    |    | C2 |
|   |    |    |    |    |    |    |    |    |    |    |    |    |    |    |    |    | C3 |
| O |    |    | X  | X  |    | X  | X  | X  | X  | X  |    |    |    | X  |    |    | C4 |
| O |    | X  | X  | X  | X  | X  | X  |    |    | X  | X  | X  | X  | X  | X  |    | C5 |
| O | X  |    | X  | X  |    | X  |    | X  | X  |    | X  |    | X  | X  |    | X  | C6 |
| O | X  | X  | X  | X  | X  | X  |    |    |    |    |    |    | X  |    |    | X  | C7 |

'O' Next to the Lines Means the Following:
If the Number of 'Ones' Included in the Associated Address Part is Odd, the Allocated Parity Bit = 1!

'E' Next to the Lines Means the Following:
If the Number of 'Ones' Included in the Associated Address Part is Odd, the Allocated Parity Bit = 0!

FIG. 2

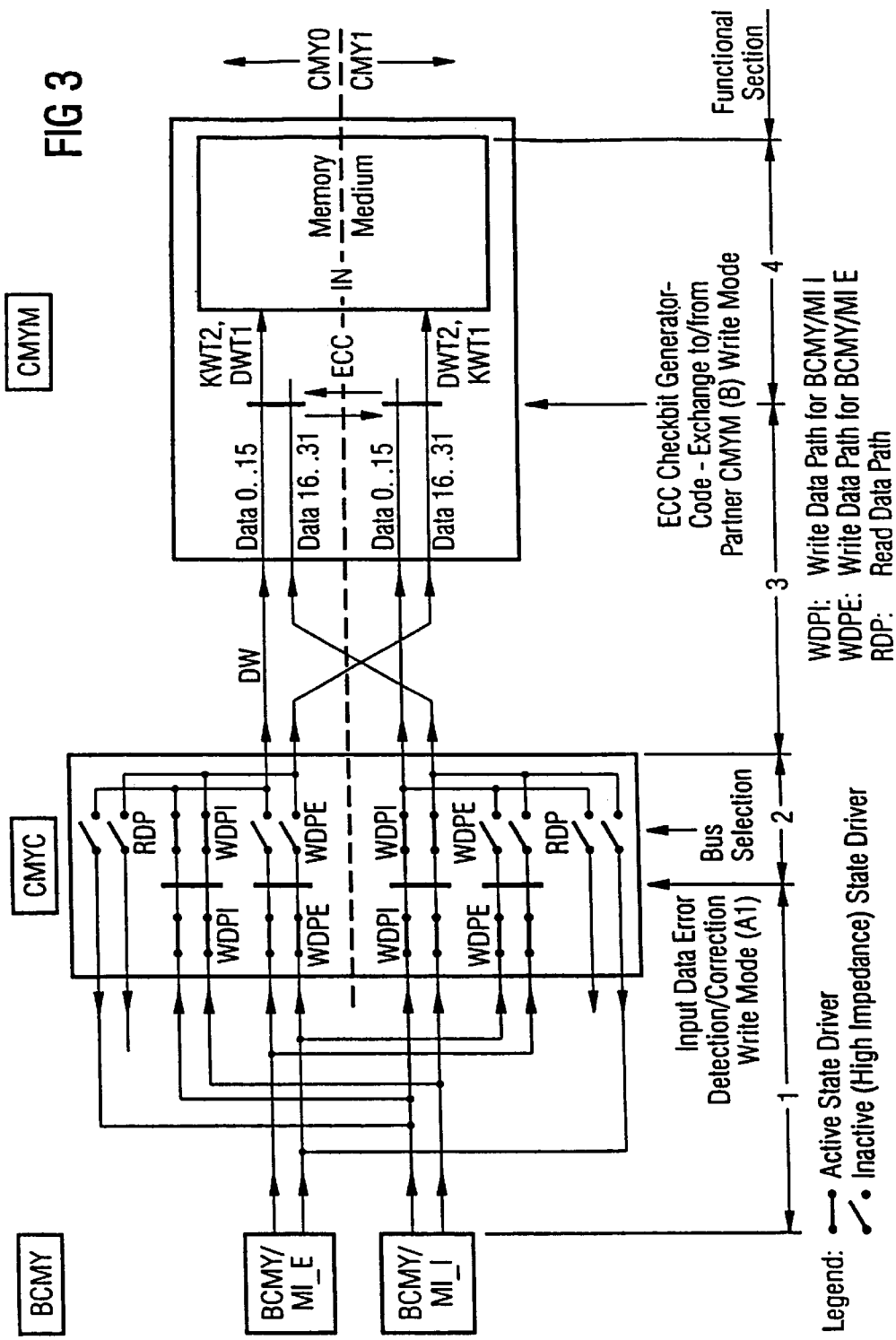

Data Errors Occurring in Section X are Recognized at Checkpoint Y

| Checkpoint:Y \ Section X | 1 | 2 | 3 | 4 | 5 | 6 | 7 | 8 | 9 |
|---|---|---|---|---|---|---|---|---|---|
| A1 | X | | | | | | | | |
| B | X | X | | | | | | | |
| C | X | X | X | X | X | X | | | |
| A2 | X | X | X | X | X | X | X | X | X |

FIG. 5

MEMORY SYSTEM HAVING ERROR MONITORING APPARATUS FOR MULTI-BIT ERRORS

This application is a 371 of PCT/DE97/01644 filed Aug. 6, 1997.

BACKGROUND OF THE INVENTION

There are memory systems whose data contents are safeguarded via an EDC code in such a way that a number of redundant bits are additionally stored under the address of the data word. These bits are called control word bits, or K-bits for short, and arise through the formation of the parity sum over particular parts of the data word, which is standardly called EDC coding ("EDC" stands for Error Detection Code). During the reading out of the memory word, the sub-parities are again formed, and are compared with the likewise read-out allocated K-bits. If all K-bits are equal, it is concluded that the read-out data word is free of errors. In the case of a non-equality, the type of error is inferred from the pattern of the non-agreement, which is called the syndrome pattern.

The K-bit positions that do not agree are called syndromes. Particular syndrome patterns are decoded, and in this way the falsified bit position in the data word is determined, if necessary, and. is corrected by inversion.

The formation of the K-bits (EDC coding), the comparison, the decoding of the syndromes, as well as the correction and, if necessary, the alerting of a higher-order control unit, currently takes place standardly with the aid of special controller modules, also referred to as EDC controllers in the following.

In FIG. 1, on the basis of what is called an EDC code table it is shown via which bit positions of a data word the K-bits are formed in an EDC controller.

In FIG. 1, the character "X" means that the allocated data bit N (00=<N=<31) is included in the parity formation for the check bit C (C0=<C=<C7). The character "0" next to the lines of the lower half of the memory word means that the associated C-bit is equal to 1 when the number of "1s" included in the parity formation in the entire useful bit part is odd. The character "E" next to the lines of the lower half of the memory word means that the associated C-bit is equal to 0 when the number of "1s" included in the parity formation in the entire bit part is odd. The two last-named statements thus relate to both halves of the memory word.

FIG. 1 presumes data words that comprise 32 data bits. Eight control bits C0, C1, C2 . . . C7 are allocated to these data bits, which control bits are respectively formed by parity formation over particular bit positions of a data word. The entire memory word, i.e. the useful word (address or data) plus the control word, thus comprises 40 bits. These are organized in DRAM memory modules with a cell width of four bits.

On the basis of the control bits formed according to the EDC code tables, one-bit errors can be recognized with certainty, and lead to odd-numbered syndrome patterns. In addition, a correction of one-bit errors can be carried out, since an unambiguous syndrome pattern is fixedly allocated to each error bit position within a useful word. This syndrome pattern can be decoded and thus used for the correction of the errored bit.

Finally, multi-bit errors can be recognized. Double bit errors always lead for example to an even-numbered syndrome pattern not equal to 0, and are thus recognized with certainty as multi-bit errors. The additional even-numbered multi-bit errors likewise always lead to even-numbered syndrome patterns, whereby the zero syndrome arises with a probability of 1/128, since at this ECC width (number of K-bits) there are a total of 128 even-numbered syndrome patterns. Thus, these errors lead immediately to a multi-bit error alert, with a probability of 99.2%.

Odd-numbered multi-bit errors lead to odd-numbered syndrome patterns, whereby the syndrome patterns of 1-bit errors can also arise. Thus, these errors are recognized immediately as multi-bit errors, with a probability of 68.75%. This number arose as follows:

Given an 8-bit ECC width, there are a total of 128 odd-numbered syndrome patterns. Of these 128 patterns, 40 are reserved for 1-bit errors. There thus remain 128−40=88 patterns for odd-numbered multi-bit errors. The probability that one of these patterns is hit in an arbitrary odd-numbered multi-bit error is thus 88/128=68.75%.

In sum, it results that arbitrary multi-bit errors are alerted immediately as multi-bit errors with a probability of 215/256=84%. The even-numbered multi-bit errors, which cause the zero syndrome in 1 of 128 cases, have hereby also been taken into account. This number in turn results as follows:

Given an 8-bit ECC width, there are a total of 256 syndrome patterns. Of these 256 patterns, 40 are reserved for 1-bit errors, and one pattern is the null syndrome pattern. There thus remain 256−40−1=215 patterns for multi-bit errors.

The probability that one of these patterns is hit given an arbitrary multi-bit error is thus 215/256=84%.

In FIG. 2, on the basis of what is called an EDC code table it is shown via which bit positions of an address word the K-bits are formed in an EDC controller. For the explanation of the representation in FIG. 2, the same holds as in FIG. 1.

If an error is present in the controlling of the memory units (e.g. memory modules) that are controlled in common, i.e. in parallel, in the context of a memory access, syndrome patterns can result that mimic a correctable one-bit error, and thus are not recognized as errors of the controlling. Other errors are also conceivable, e.g. failure of the write pulse, that cannot be recognized at all via the EDC controller.

The problem named can be reduced considerably if the memory units (i.e. memory modules) that are activated in common during the reading are supplied by several control signals of the same type that originate from self-contained control units. In this case, only the failure of one of these signals need be reckoned with, whereby e.g. data and control bits of different memory words can be mixed with one another during the reading out. However, despite this measure, designated measure A) for short in the following, it is still possible, though with low probability, that one-bit errors or even freedom from error are mimicked.

The last-named problem can however be prevented by suitable partitioning of the data and control bits to the memory units in connection with the associated choice of the EDC codes (see FIG. 1). From FIG. 1, it can be seen that a segment of the control word that is not stored together with that segment of the control word in which there is a one-bit falsification (e.g. the data word segment DWT1 with the control word segment KWT1) can respectively contribute only an even number to the syndrome pattern. On the other hand, a segment of the data word that is stored together with the segment of the control word (e.g. the segment DWT1 with KWT2) can contribute only an odd number to the syndrome pattern. However, the latter case cannot take place given errors that arise from the false controlling (addressing)

of a memory unit. Thus, given a false controlling only even-numbered syndrome patterns can arise.

The suitable partitioning of the data and control bits to the memory units in connection with the associated selection of the EDC code is designated as measure B) for short in the following.

The general formation rule for the cited partitioning given more than two memory medium units is explained in more detail in the German patent application P 35 28 902.3-31 (SAG-internal GR 84 P 1995).

Apart from the cited errors, multi-bit errors can also occur within the memory system during the transfer of the memory words between the memory and the memory control unit, which multi-bit errors can be falsely recognized as one-bit errors by the EDC controllers in the memory or, respectively, in the memory control unit.

SUMMARY OF THE INVENTION

The underlying aim of the invention is to improve the recognizability of the last-named multi-bit errors.

By means of the inventive partial cross-connection of the doubled line paths between the memory (CMYM) and the memory control unit (CMYC), the recognizability of multi-bit errors is improved considerably.

In general terms the present invention is a memory system having the following elements. A memory stores memory words that respectively have a data word and a control word. The memory has two memory units. A segment of the data word, together with a segment of the control word, is respectively stored in each memory unit. The memory has two error monitoring means that carry out an error monitoring of the memory word on the basis of the control word. A memory control unit controls the memory, which also has two error monitoring means for error monitoring between the memory control unit and the memory. A doubled line structure connects the memory control unit and the memory for the doubled transfer of the memory words between the memory control unit and the memory. The doubled line structure between the memory and the memory control unit is partially cross-connected, such that one of the two segments of the data word is cross-connected.

The named error monitoring means carry out the error monitoring such that they produce a control word as a particular formation rule, using a coding means, from the memory word to be monitored, compare the bits of this control word (K-bits) with the K-bits contained in the memory word, and, given inequality, infer the type of error from the pattern of the equal and unequal K-bits, called the syndrom pattern. The named formation rule is selected such that given a one-bit error, the named comparison yields an odd number of unequal K-bits, whereby an even number of unequal K-bits respectively contribute to the odd number from those segments of the control word that are not stored together with that segment of the data word in which the one-bit falsification is present. This embodiment has the advantage that the recognizability of multi-bit errors is further improved substantially.

The named segment-by-segment partitioning of the data bits and K-bits to the two memory units of the memory system (given a predetermined EDC code) is selected such that an even number of K-bits are involved in an odd syndrome pattern based on a one-bit error, which K-bits are not stored together with that segment of the data word in which the one-bit falsification is present. This embodiment has the effect that the recognizability of multi-bit errors is ensured with almost one hundred percent reliability.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, in which:

FIG. 2 depicts another EDC code table example;

FIG. 3 depicts a memory system according to the present invention;

FIG. 5 depicts which central point data errors, occurring in a particular segment of the memory system, are recognized.

DESCRIPTION OF THE PREFERRED EMBODIMENTS

Figure 1:
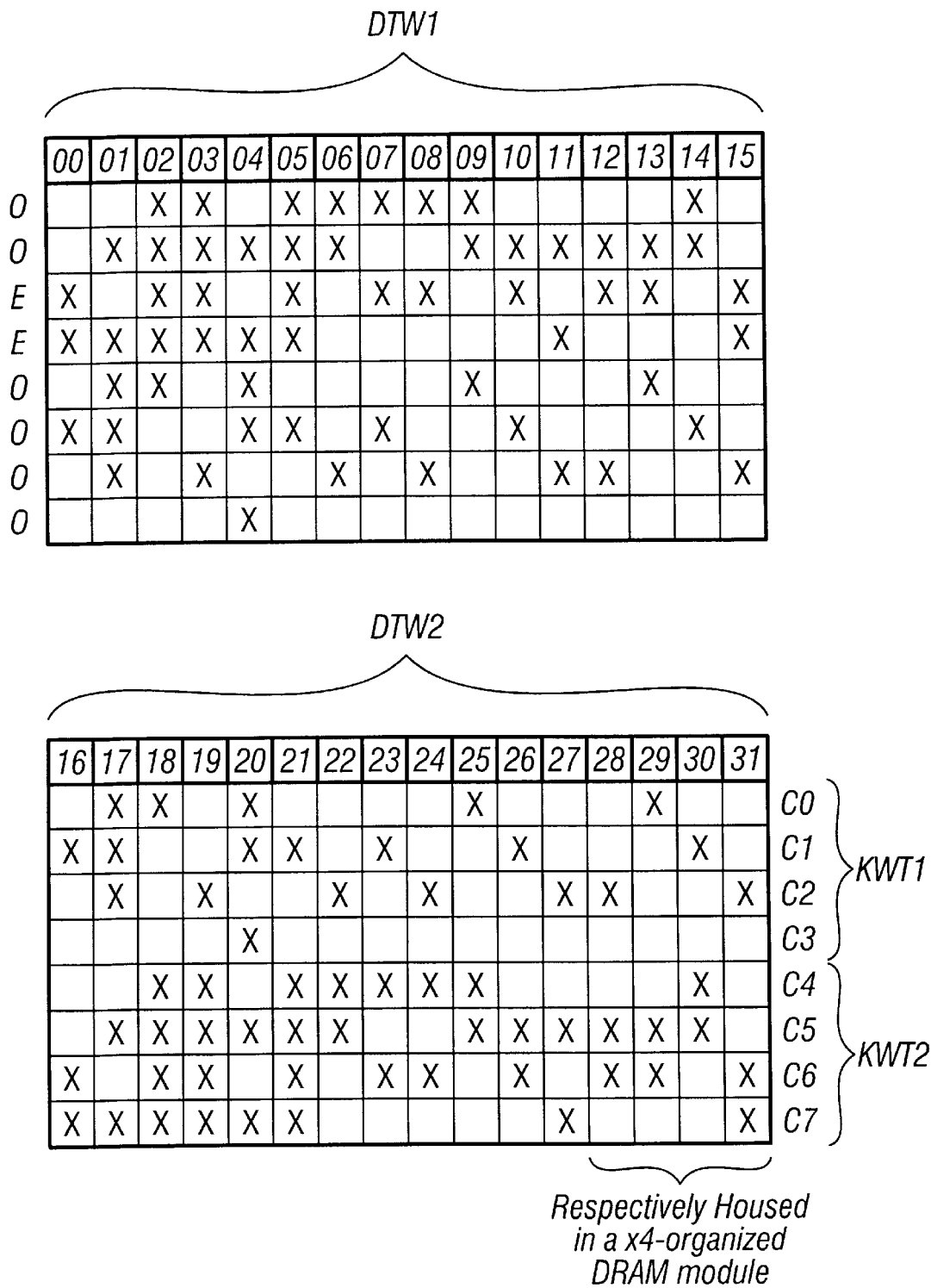
FIG. 1 depicts an EDC code table from which is shown bit positions of a data word that form the K-bits in an EDC controller.

As already explained, FIG. 1 shows an EDC code that is selected correspondingly for the realization of measure B) for a memory system with two memory units.

In addition, the EDC code shown in FIG. 1 is selected such that a data word segment, i.e. a segment of the data word that is not stored together with another segment of the data word (e.g. the segments DWT1 or, respectively, DWT2 in FIG. 1), is involved in the formation of a K-bit with, respectively, an even number of bit locations, if this is a data word segment that is not stored together with this K-bit, and is involved with an odd number of bit locations if it is a data word segment stored together with this K-bit.

By means of the cited selection of the EDC code, called measure 1) for short in the following, the errors 'all 0' or 'all 1' in one half of a memory word (=half the data+associated half of ECC bits) will thus always lead to even-numbered syndrome patterns. By this means, these errors are alerted as multiple errors. Since the two memory units of the word halves are controlled by separate control units, and many control errors have the effect described above (all 0 or all 1), by this means the distinguishing of these errors from 1-bit errors is improved considerably.

FIG. 3 shows an inventive memory system CMY having a doubled (memory) control system CMYC, a (memory) medium system CMYM ("memory") for short with two memory units, i.e. two (memory) medium halves, as well as a doubled bus interface BCMY via which the connection with the bus system of a computer system is created.

The memory system comprises an error monitoring unit that provides different control points with the aid of EDC controllers dependent on the machine cycle (read or write cycle).

All data paths in the CMY, i.e. between BMCY and CMYM, are present in doubled form, and in each data path the full width of the data words (32 bits) is used at the control points of corresponding EDC controllers for error monitoring, independently of one another.

FIG. 3 shows, in particular, the configuration of the data paths and control points of the memory system for a write cycle.

In the write cycle, the write data and associated K-bits coming from the BCMY first reach a control point A1 via write paths WDPI. At this control point, the already-named error monitoring is carried out, in which bit errors (one-bit or multi-bit errors) are recognized and one-bit errors are even corrected.

Subsequently, the write data are forwarded to the memory CMYM in doubled fashion (but without control bits).

At the control point B, i.e. immediately before the writing of the write data into the memory, in each of the two transmission halves a control word is generated again from the write data, and a comparison ECC of the two control words is carried out. The two control words are identical only if the data have been processed in error-free fashion in both halves up to that point; otherwise there is an alerting of a multiple error, i.e. of an error that cannot be corrected. By means of the comparison ECC, errors are found that are due among other things to a faulty transmission between A1 and B, or are caused by faulty EDC networks at the control points A1 or B.

The control bits of control point A1 are not required for the control point B, since they are again generated from the write data at the control point B, i.e. immediately before the writing of the write data into the medium system, and because they are not required for the error monitoring between A1 and B. The error monitoring between A1 and B is already ensured by the comparison of the two control words formed at the control point B.

The transmission path of the data between A1 and B is partially cross-connected. If there is a selection error (control error) in one transmission half, there are inconsistencies at the control point B. This causes the alerting of a multiple error.

If the comparison at the control point B yields no inconsistencies, the data, including the control word, are written into the medium system. In particular, the data bits 0 . . . 15 (DWT1) are thereby written into the one medium half together with the K-bits 4 . . . 7 (KWT2), and the data bits 16 . . . 32 (DWT2) are written into the other medium half together with the K-bits 0 . . . 3 (KWT1).

By means of the explained segment-by-segment monitoring of the data paths for control errors in connection with the exchange of the memory word halves between both control units, from the combined view of the alerts of different EDC modules it is possible to derive the location at which the error has arisen.

In order to prevent a possible faulty write process that takes place in segment 4, i.e. directly during the writing in, instead of a pure write cycle a read/write cycle is carried out, whereby an EDC check of the read data, and thereby a check of the controlling of a memory cell, takes place, before a correctly controllable memory cell is overwritten by the miscontrolling of a faulty write process. The read process thereby remains internal, i.e., the BCMY does not record the read data, in order to emit them to the bus. The write data are stored intermediately in the CMYM until the termination of the read check. On the basis of this measure, the system effects of control errors are kept low, and the (control) errors are better differentiated and are recognized more quickly.

Specifically, this measure, combined with the named measures A) and B), brings it about that errors in the selection of a memory word half (e.g. caused by addressing errors) are recognized as multi-bit errors already before the reading out of the falsified memory word. Combined with measure C), this likewise holds for the addressing errors of entire memory words. The same advantage holds for multi-bit falsifications caused by errors inside a memory module.

For reasons of clarity, up to now the application of the EDC coding has been explained only in relation to the data word. However, in fact not only the data word but also the memory address of the data word is included in the EDC coding, i.e. in the parity formation (see FIG. 2). The EDC code is thereby selected with respect to the data word in such a way that given a one-bit error in the address word only one even-numbered syndrome pattern can arise. However, this means that, likewise, only one even-numbered syndrome pattern can arise from a multi-bit error. Thus, given an addressing error there is always an alerting of a multiple error, i.e. of an uncorrectable error. The inclusion of the address in the EDC coding is explained in more detail in the laid open print DE 3319710 A1 (SAG-internal 83 P 1382 DE), and is designated measure C) for short in the following.

In order to minimize the generation of the address parity bits required for the measure C), there takes place an additional use of the data EDC modules for the generation of the address parity bits. This becomes possible by means of time division multiplexing of the address and data, as well as formation of the address parity bits according to FIG. 2, i.e. from a subset of the EDC coding of FIG. 1. By this means, the condition, required for measure C), of even-numberedness per address bit is maintained. For this purpose, the condition, required for measure B), of even-numberedness of particular code segments is used.

Figure 4:
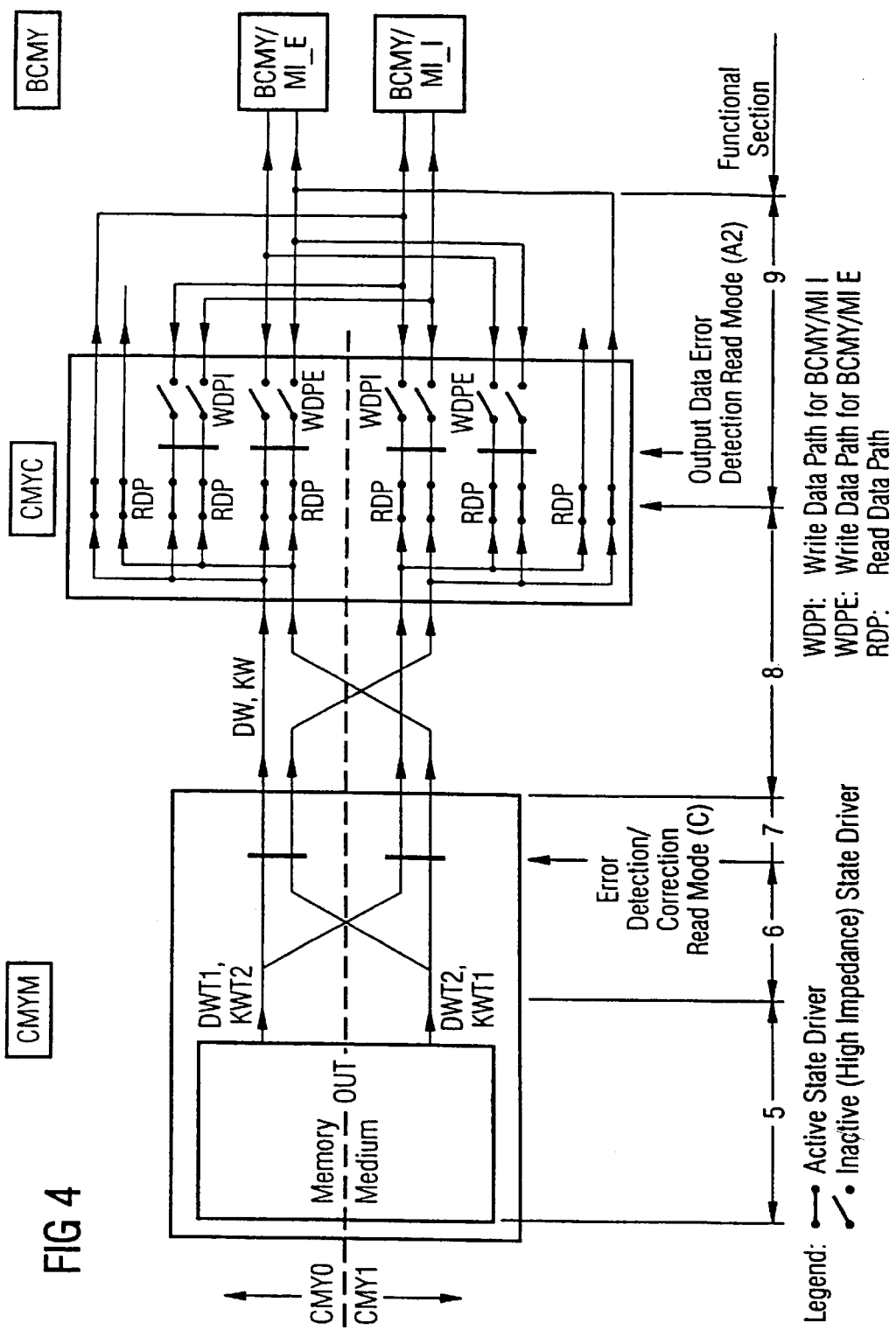
FIG. 4 depicts the configuration of the data paths and control points of the memory system for a read cycle.

FIG. 4 shows the configuration of the data paths and control points of the memory system for a read cycle.

During the read cycle, the data word and the associated control word are first read out and then reach the control point C, at which an error recognition and, if warranted, error correction are carried out. Subsequently, the data word and the control word are forwarded to the bus interface BCMY, whereby an error recognition is again carried out at the control point A2. In case of error, this error recognition brings it about that the bus interface BCMY blocks the forwarding of the data word and of the control word to the bus. Moreover, in this case the defective memory system half (CMY0 or CMY1) is switched away from the bus interface BCMY.

In connection with FIGS. 3 and 4, FIG. 5 shows at which control point (Checkpoint Y) data errors occurring in a particular segment (Section X) of the memory system are recognized.

The following are some examples of specific errors and their processing by the error monitoring system.

EXAMPLE 1

Recognition of Control Errors with the EDC Safeguarding

Error case: False selection of a memory word half
Means for recognition: Measure A) and B)

Allocation of the bit positions:

X=controlled by control 0, Y=controlled by control 1
bold=faulty information part

```
31              16 15               00    C7 C4 C3 C0
YYYYYYYYYYYYYYYY|XXXXXXXXXXXXXXXX     XXXX|YYYY
``` consistent memory word under address 1:

```
31              16 15               00    C7 C4 C3 C0
0000000000000000|0000000000000000      0000|1100
``` consistent memory word under address 2:

```
31              16 15               00    C7 C4 C3 C0
1111111111111111|1111111111111110      1101|1111
```

During reading out under address 2, control 0 erroneously read out under address 1. This leads to the following read information:

```
31              16 15                 00    C7 C4 C3 C0
1111111111111111|0000000000000000          0000|1111

The ECC bits formed via the read data     :0000|0011
                                           C7 C4 C3 C0

Even-numbered syndrome pattern that       :0011|1100
arises from exclusive OR combination       S7 S4 S3 S0
of the read bits with
the newly formed ECC bits
```

This causes alerting of a multi-bit error!

EXAMPLE 2

Recognition of Control Errors with EDC Safeguarding

Error case: a memory word half remains high-ohmic

Recognition means: Measure 1)

Allocation of the bit positions:

X=controlled by control 0, Y=controlled by control 1 bold=faulty information part

```
31              16 15                 00    C7 C4 C3 C0
YYYYYYYYYYYYYYYY|XXXXXXXXXXXXXXXX          XXXX|YYYY consistent memory word under address 1:

31              16 15                 00    C7 C4 C3 C0
1010101010100010|1010101010101010          0000|0111
```

During reading under address 1, control 1 erroneously did not switch the associated data outputs and ECC outputs low-ohmic. This leads to the following read information:

```
31              16 15                 00    C7 C4 C3 C0
1111111111111111|1010101010101010          0000|1111

The ECC bits formed via the read data     :0011|0011
                                           C7 C4 C3 C0

Even-numbered syndrome pattern that       :0011|1100
arises from exclusive OR combination       S7 S4 S3 S0
of the read bits with
the newly formed ECC bits
```

This causes alerting of a multi-bit error!

EXAMPLE 3

Recognition of Memory Word Address Errors

Error case: Addressing error (simple error) to memory cell with the same data content Means for recognition: Measure C), i.e. the physical address was included in the formation of the ECC bits (see FIG. 2)

```
consistent memory word under address
   B'1110101010101010101000:
      ECC bits gen. from the data alone   :1111|0011
      Par. bits generated from the adr.   :0110|0101
      ECC resulting from exclusive OR     :1001|0110
      combination
```

-continued

```
   Overall memory word:
   1010101010101010|1010101010101010        1001|0110
   31              16 15                 00  C7 C4 C3 C0 consistent memory word under address
   B'1010101010101010000:
      ECC bits gen. from the data alone   :1111|0011
      Par. bits generated from the adr.   :1010|0101
      ECC resulting from exclusive OR     :0101|0110
      combination Overall memory word:
   1010101010101010|1010101010101010        0101|0110
   31              16 15                 00  C7 C4 C3 C0
```

During the intended reading under address

B'1110101010101010101000 reading out erroneously took place under address

B'1010101010101010000

This leads to the following read information:

```
31              16 15                 00    C7 C4 C3 C0
1010101010101010|1010101010101010          0101|0110

New generation of the ECC bits:            C7 C4 C3 C0
   ECC bits gen. from the data alone      :1111|0011
   Par. bits gen. from the target         :0110|0101
   adr.
   ECC resulting from                     :1001|0110
   exclusive OR combination
Even numbered syndrome pattern that       :1100|0000
arises from exclusive OR combination of    S7 S4 S3 S0
the read bits with the newly formed ECC
bits
```

This causes alerting of a multiple error!

EXAMPLE 4

Recognition of Memory Word Addressing Errors

Error case: Addressing error (multiple error) to memory cell with different data content Means of recognition: Measure C), i.e., the physical address was included in the formation of the ECC bits (see FIG. 2)

```
Consistent memory word under address
B'1110101010101010101000:
   ECC bits gen. from the data alone     :1111|0011
   Par. bits gen. from the target        :0110|0101
   adr.
   ECC resulting from exclusive OR       :1001|0110
   formation
   Overall memory word:
   0101010101010101|1010101010101010        1001|0110
   31              16 15                 00  C7 C4 C3 C0
Consistent memory word under address
B'1110111011100001000:
   ECC bits gen. from the data alone     :0000|0011
   Par. bits gen. from the target        :0110|1001
   adr.
   ECC resulting from exclusive          :0110|1010
   OR formation
   Overall memory word:
   1111111111111111|0000000000000000        0110|1010
   31              16 15                 00  C7 C4 C3 C0
```

Consistent memory word under address
   111011101110001000

```
    ECC bits gen. from the data alone   :0000|0011
    Par. bits gen. from the target      :0110|1001
    adr.
    ECC resulting from exclusive        :0110|1010
    OR formation
    Overall memory word:
1111111111111111|0000000000000000        0110|1010
31            16 15                00    C7 C4 C3 C0
```

During the reading under the address
   111010101010101000
reading out erroneously took place under the address
   111011101110001000
This leads to the following read information:

```
1111111111111111|0000000000000000        0110|1010
31            16 15                00    C7 C4 C3 C0
New generation of the ECC bits:
                                         C7 C4 C3 C0
    ECC bits gen. from the data alone   :0000|0011
    Par. bits gen. from the target      :0110|0101
    adr.
    ECC resulting from exclusive OR     :0110|0110
    formation                            C7 C4 C3 C0
Even-numbered syndrome pattern that     :0000|1100
arises from exclusive OR combination     S7 S4 S3 S0
of the read bits with the
newly formed ECC bits
```

This causes alerting of a multiple error!

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A memory system, comprising:
   a memory in which memory words are stored that respectively have a data word and a control word, the memory having
   a) two memory units, wherein a data word segment and a control word segment are respectively stored together in each memory unit, and
   b) two error monitoring apparatuses that carry out an error monitoring of the memory word for multi-bit errors based on the control word;
   a memory control unit for controlling the memory, the memory control unit having an additional two error monitoring apparatuses for error monitoring between the memory control unit and the memory; and
   a doubled line structure between the memory control unit and the memory for doubled transfer of the memory words between the memory control unit and the memory, wherein the doubled line structure between the memory and the memory control unit is partially cross-connected such that one of the two segments of each data word being transferred is cross-connected.

2. The memory system of claim 1, wherein during a write operation, error monitoring is first carried out in the error monitoring apparatuses in the memory control unit before the data word to be written is forwarded to the memory units, and is then carried out a second time in the error monitoring apparatuses in memory before writing the data word.

3. The memory system of claim 1, wherein during a read operation, error monitoring first carried out in the error monitoring apparatuses in memory as the data word is read, and is then carried out a second time in the error monitoring apparatuses in the memory control unit.

4. A memory system, comprising:
   a memory in which memory words are stored that respectively have a data word and a control word;
   a memory having two memory units, a segment of the data word together with a segment of the control word being respectively stored in each memory unit;
   the memory having two error monitoring apparatus that carry out an error monitoring of the memory word based on the control word;
   a memory control unit for controlling the memory, the memory control unit also having two error monitoring apparatus for error monitoring between the memory control unit and the memory;
   a doubled line structure between the memory control unit and the memory for doubled transfer of the memory words between the memory control unit and the memory;
   the doubled line structure between the memory and the memory control unit being partially cross-connected such that one of two segments of the data word is cross-connected; and
   the error monitoring apparatus carrying out the error monitoring such that the error monitoring apparatus produce a respective control word as a predetermined formation rule, using a coding unit, from a memory word to be monitored, compare bits of the respective control word with K-bits contained in the memory word, and, given inequality, infer a type of error from a pattern of equal and unequal K-bits, and the predetermined formation rule being selected such that given a one-bit error, the comparison yields an odd number of unequal K-bits so that an even number of unequal K-bits respectively contribute to the odd number of unequal K-bits from segments of the control word that are not stored together with a segment of the data word in which the one-bit error is present.

5. The monitoring system according to claim 4 wherein segment-by-segment partitioning of the data bits and K-bits to the two memory units of the memory system is selected such that an even number of K-bits are involved in an odd syndrome pattern based on a one-bit error, said K-bits not being stored together with a segment of the data word in which the one-bit error is present.

6. The monitoring system according to claim 4 wherein the pattern of equal and unequal K-bits is a syndrome pattern.

* * * * *